United States Patent [19]

Cronin et al.

[11] Patent Number: 5,326,430
[45] Date of Patent: Jul. 5, 1994

[54] COOLING MICROFAN ARRANGEMENTS AND PROCESS

[75] Inventors: John E. Cronin, Milton; Rosemary A. Previti-Kelly, Richmond, both of Vt.; James G. Ryan, Sandy Hook, Conn.; Timothy D. Sullivan, Underhill, Vt.

[73] Assignee: International Business Machines Corporation, Armonk, N.Y.

[21] Appl. No.: 164,494

[22] Filed: Dec. 7, 1993

Related U.S. Application Data

[62] Division of Ser. No. 950,621, Sep. 24, 1992, Pat. No. 5,296,775.

[51] Int. Cl.$^5$ ............... H01L 21/306; B44C 1/22; C23F 1/00; C03C 15/00
[52] U.S. Cl. ............... 156/656; 156/644; 156/655; 156/657; 156/662
[58] Field of Search ............ 156/643, 644, 653, 655, 156/656, 657, 659.1, 662, 663, 668; 310/40 R, 40.5, 261, 262, 309; 437/228, 233, 238, 241, 245

[56] References Cited

U.S. PATENT DOCUMENTS

| | | | |
|---|---|---|---|
| 3,629,624 | 12/1971 | Staudie | 310/6 |
| 3,708,703 | 1/1973 | Dove | 310/10 |
| 4,513,812 | 4/1985 | Papst et al. | 165/80 |
| 4,520,375 | 5/1985 | Kroll | 346/140 R |
| 4,711,128 | 12/1987 | Boura | 73/517 B |
| 4,740,410 | 4/1988 | Muller et al. | 428/133 |
| 4,814,657 | 3/1989 | Yano et al. | 310/309 |
| 4,860,165 | 8/1989 | Cassinelli | 361/388 |
| 4,943,750 | 7/1990 | Howe et al. | 310/309 |
| 5,043,043 | 8/1991 | Howe et al. | 156/645 |
| 5,093,761 | 3/1992 | Ozaki | 361/414 |
| 5,113,100 | 5/1992 | Taghezout | 310/40 |
| 5,151,153 | 9/1992 | Bol | 156/656 X |
| 5,180,940 | 1/1993 | Paratte et al. | 310/40 MM |

FOREIGN PATENT DOCUMENTS

| | | |
|---|---|---|
| 56-104305 | 8/1981 | Japan . |
| 644020 | 1/1979 | U.S.S.R. . |
| 1237982 | 7/1971 | United Kingdom . |

OTHER PUBLICATIONS

I. Amato, "Small Things Considered," Jul. 1, 1989, Science News, vol. 136, pp. 8-10.
I. Kim, "Input-Output-Positive Rat Race," Jul. 1990, Mechanical Engr., p. 112.
B. Fox, "Technology-Conference leaves high-definition TV up in the air," Jun. 2, 1990, New Scientist, vol. 26, pp. 34-35.
O. Rohde et al., "Recent advances in photoimagable polyimides," SPIE, vol. 539 Advances in Resist Technology and Processing 11 (1985), pp. 175-180.

(List continued on next page.)

Primary Examiner—William Powell
Attorney, Agent, or Firm—Stephen J. Limanek

[57] ABSTRACT

A micro electrostatic cooling fan arrangement is provided which includes a heat source having a planar surface, a stator attached to the heat source, an axle attached to the heat source and spaced from the stator, a rotary element including a hub having an aperture therein and a fan blade, the axle passing through the aperture of the hub and the fan blade having a major surface thereof disposed at an angle with respect to the surface of the heat source and attached to the hub at one end, with the other end of the fan blade being adjacent to but spaced from the stator and a voltage source applied to the stator having sufficient voltage to charge the fan blade. Also, a process is provided for making a microfan which includes forming a strip of sacrificial material on a planar surface of a heat source, applying a spin on insulating layer over the heat source and the strip for producing a sloping surface extending from about the top of the strip toward the planar surface of the heat source, applying a layer of conductive material on the sloping surface and strip and defining from the layer of conductive material a fan blade on the sloping surface of the spin on insulating layer and a stator at one end of the fan blade.

7 Claims, 3 Drawing Sheets

OTHER PUBLICATIONS

L. Fan et al., "Pin Joints, Gears, Springs, Cranks and Other Novel Micromechanical Structures," Transducers '87, University of California, Berkeley, pp. 849–852.

S. A. Motley, "Trends-Micro-Machines," Photo: NASA, Jan. 1989, pp. 10–11.

D. Stewart, "New Machines are smaller than a hair, and do real work," Smithsonian 84, Nov. 1990, pp. 85–95.

P. Elmer-Dewitt, "Technology-The Incredible Shrinking Machine," Time, Nov. 20, 1989, pp. 108–111.

A. Wolfe, "Micromachining Moves Into High Gear," Mechanical Engr., Sep. 1990, pp. 49–53.

"Micromachining: A Revolution in the Making," Mechanical Engr., Mar. 1989, pp. 47–48.

R. T. Howe et al., "Silicon micromechanics: sensors and actuators on a chip," IEEE Spectrum, Jul. 1990, pp. 29–35.

W. S. N. Trimmer, "Silicon Electrostatic Motors," Transducers 87, pp. 857–860.

D. B. Tuckerman, "High-Performance Heat Sinking for VLSI," IEEE Electron Device Letters, vol. EDL-2, No. 5, May 1981, pp. 126–129.

K. J. Gabriel, "Micro Gears and Turbines Etched from Silicon," Transducer 87, Jun., pp. 853–856.

W. S. N. Trimmer et al., "Design Considerations for a Practical Electrostatic Micromotor," Sensors and Actuators, pp. 189–206.

L. Fan et al., "IC-Processed Electrostatic Micro-motors," IEEE IEDM, Dec. 11, 1988, pp. 666–669.

J. H. Lang et al., "Toward the Design of Successful Electric Micromotors," IEEE, 1988, pp. 127–130.

R. Gannon, "Micromachine," Popular Science, Mar. 1989, pp. 88–92.

"Probimide" 300 Series, Ciba-Geigy Microelectronic Chemicals.

COOLING MICROFAN ARRANGEMENTS AND PROCESS

This is a divisional of copending application(s) Ser. No. 07/950,621 filed on Sep. 24, 1992 now U.S. Pat. No. 5,296,775.

TECHNICAL FIELD

This invention relates to a micro electrostatic cooling fan arrangements for cooling an integrated circuit semiconductor chip or wafer and for a process for making same.

BACKGROUND ART

Increasing packaging densities in the integrated circuit technology used in computer systems, wherein 200 million or more operations are completed in a second, has increased the demands on integrated circuit chip or wafer cooling methods due to the generation of heat which can be sufficiently high enough to damage the chip, generally made of silicon, unless it is appropriately cooled. A number of methods have been proposed to cool these chips including passive type cooling systems which remove the heat from critical package areas through various heat conduction techniques such as the use of a copper fin cooling system placed directly on the package. Active type cooling systems have also been proposed to cool these chips or wafers such as by pumping fluids through micro channels formed in the package. An active type cooling system described in, e.g., "High-Performance Heat Sinking for VLSI", by D. B. Tuckerman et al, IEEE Electron Device Letters, VOL. EDL-2, No. 5, May 1981, pp. 126–129, discloses the formation of microscopic channels formed in an integrated circuit silicon chip for carrying a coolant. Microchannels are also used to cool chips in the system disclosed in an article entitled "Chip coolers", in Popular Science, June 1990, pp. 40 and 41.

In the field of microdynamics, micromechanical systems, such as micromotors, are being developed which have no parts with dimensions much larger than 100 micrometers. An article entitled "IC-Processed Electrostatic Micro-motors", by L-S. Fan et al, in IEDM 88, 1988, pp. 666–669, describes micro-motors wherein both rotors and stators, driven by electrostatic forces, are formed from 1.0–1.5 micrometer thick polycrystalline silicon with the diameters of the rotors in the motors tested are between 60 and 120 micrometers. Also an article entitled "Micromachines" in Popular Science, March 1989, pp. 88–92 and 143, discloses electrostatic microscopic motors mass-produced with other mechanisms on silicon wafers. Another article entitled "Silicon micromechanics: sensors and actuators on a chip" by R. T. Howe et al, IEEE Spectrum, July 1990, pp. 29–31, 34 and 35, describes fabricating minute motors using the integrated circuit manufacturing processes.

An article entitled "Micro Gears and Turbines Etched from Silicon" by K. J. Gabriel et al, in Transducers '87, June 1987, Pp. 853–856, discloses the fabrication of micro air-turbines etched from silicon. U.S. Pat. No. 4,740,410, by R. S. Muller et al, issued Apr. 26, 1988, and entitled "Micromechanical Elements and Methods for Their Fabrication" discusses the use of polycrystalline silicon as the material for making micromechanical members while using phosphosilicate glass for sacrificial layers during the fabrication of the micromechanical elements. "Design Considerations for a Practical Electrostatic Micro-motor", by W. S. N. Trimmer et al, in Sensors and Actuators, 11 (March 1987), pp. 189–206 discusses the design of electrostatic motors utilizing the advances in silicon technology.

U.S. Pat. No. 4,943,750, by R. T. Howe et al, issued Jul. 24, 1990, discloses an electrostatic micromotor used as an air pump by micromachining an aperture underlying the rotor and apertures at a corresponding radius in the rotor. A Union of Soviet Socialist Republic patent SU 0644-020, dated Jan. 28, 1979, discloses an electrostatic motor formed in a dielectric cylinder with rotation transmitted to fan vanes.

DISCLOSURE OF THE INVENTION

It is an object of this invention to provide electrostatic fans formed on the surface of an integrated circuit semiconductor chip or wafer for cooling the surface thereof and a process for making same.

In accordance with the teachings of this invention, a micro electrostatic cooling fan arrangement, which may be called a microfan, is provided which includes a heat source having a planar surface, a stator attached to the heat source, an axle attached to the heat source and spaced from the stator, a fan blade element including a hub having an aperture therein and a blade, the axle passing through the aperture of the hub and the blade having a major surface thereof disposed at an angle with respect to the surface of the heat source and attached to the hub at one end, with the other end of the blade being adjacent to but spaced from the rotor and a voltage source applied to the stator having sufficient voltage to charge the blade.

Also in accordance with the teachings of this invention a process is provided for making the microfan which includes forming a strip of sacrificial material on a planar surface of a heat source, applying a spin on insulator, such as glass, over the heat source and the strip for providing a sloping surface extending from about the top on the strip toward the planar surface of the heat source, applying a layer of conductive material on the sloping surface and strip and defining from the layer of conductive material a rotor blade on the sloping surface of the spin on insulator and a stator at one end of the blade.

The foregoing and other objects, features and advantages of this invention will be apparent from the following more particular description of the preferred embodiments of the invention, as illustrated in the accompanying drawings.

BEST MODE FOR CARRYING OUT THE INVENTION

Figure 1:
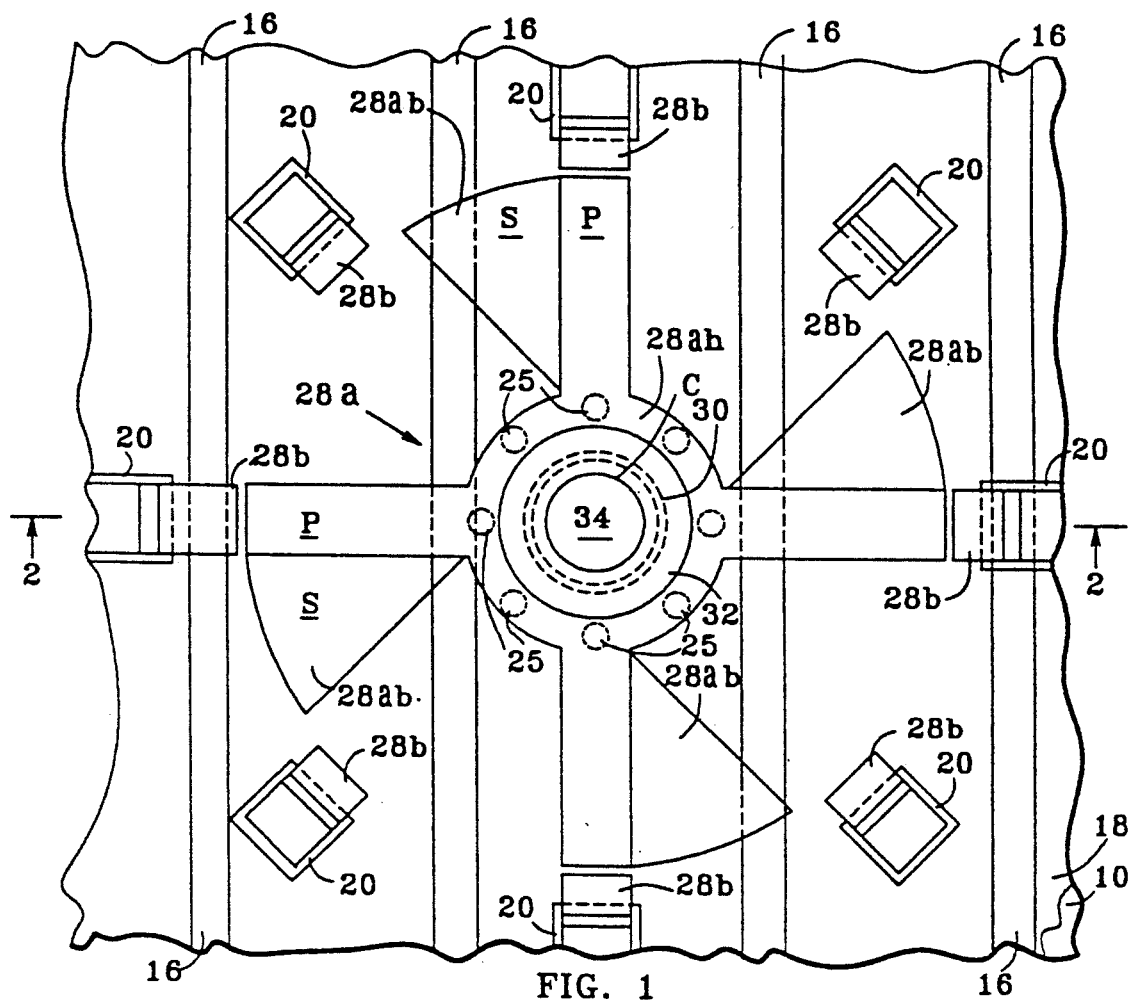
FIG. 1 is a plan view of the fan arrangement in accordance with the teachings of the present invention.
Figure 2:
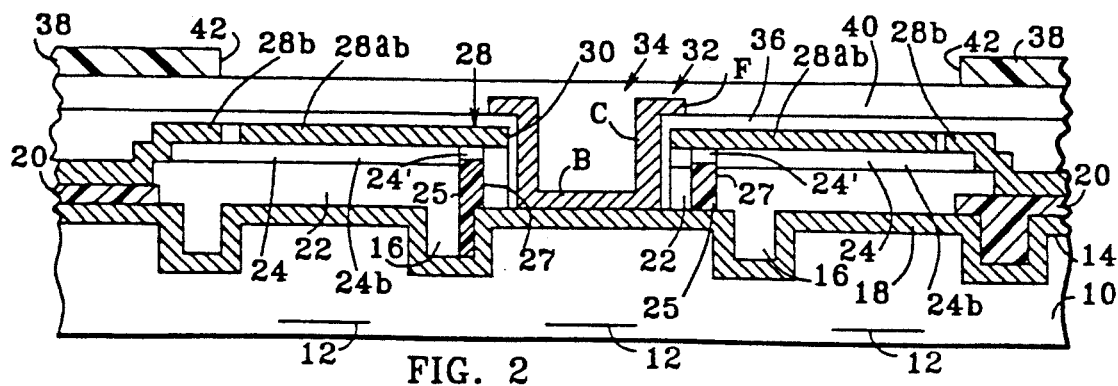
FIG. 2 is a sectional view of the fan arrangement of the present invention taken through line 2—2 of FIG. 1 of the drawings, showing additionally some of the sacrificial layers used during manufacturing of the fan but not yet removed.

Referring to the drawings in more detail, there is illustrated in FIG. 1 in plan view the fan arrangement of the present invention, with FIG. 2 showing a sectional view of the fan arrangement taken through line 2—2 of FIG. 1 before some of the sacrificial layers have been removed during the manufacturing process. In the various figures of the drawings like reference characters refer to similar elements. As shown in FIGS. 1 and 2, a semiconductor substrate or chip 10, preferably made of silicon, has a high density of integrated circuits formed therein, indicated by lines 12 in FIG. 2, which generate a considerable amount of heat, e.g., as much as 30 watts in a chip approximately ½ by ⅜ inches and at least by 1.5 millimeters thick. On the back side or surface 14 of the chip 10 grooves or channels 16 may be formed to aid in the dissipation of heat from the chip 10. Also, to further aid in the dissipation of the heat, a thermally conductive layer 18, which may be, e.g., chemically vapor deposited tungsten or copper, is conformally applied to the back surface 14 of the chip 10 and the surfaces within the channels 16, as shown in FIG. 2 of the drawings.

An insulating layer 20, preferably silicon nitride, is next applied over the thermally conductive layer 18 and into the channels 16 and appropriately masked by a first mask, not shown, to define insulating segments on the thermally conductive layer 18, indicated in FIGS. 1 and 2, on which stators are to be formed. A sacrificial planarizing layer 22, preferably silicon dioxide, is now formed over the thermally conductive layer 18 and the insulating silicon nitride segments 20 simply to establish a planar work surface, if desired. By using a wet etch process and a second mask the sacrificial planarizing layer 22 is removed from the silicon nitride segments 20. A second sacrificial layer 24 is then deposited over the sacrificial planarizing layer 22.

If a bushing or bearing 25, as shown in FIGS. 1 and 2, is desired to reduce friction during the rotation of fan blades, a series of holes or openings 27 disposed in a circular arrangement are etched through sacrificial layers 24 and 22, with the use of a third mask, to the thermally conductive layer 18, as indicated in FIGS. 1 and 2. A second layer of silicon nitride is then conformally deposited over the second sacrificial layer 24 filling each of the holes 27 in the series of, e.g., eight, holes. Reactive ion etching or a suitable wet etch may be used to remove all of the second layer of silicon nitride except for the bushings or bearings 25 formed in the holes 27, each of which has an upper surface located somewhat below the upper surface of the second sacrificial layer 24, as may be seen in FIG. 2 of the drawings. The second sacrificial layer 24 and the upper surfaces of the bushings or bearings 25 are then covered with a third sacrificial layer. If desired, the entire third sacrificial layer may be removed except for the segments 24' located at the upper surface of the bushings or bearings 25, by appropriate etching, as also shown in FIG. 2 of the drawings.

Figure 3:
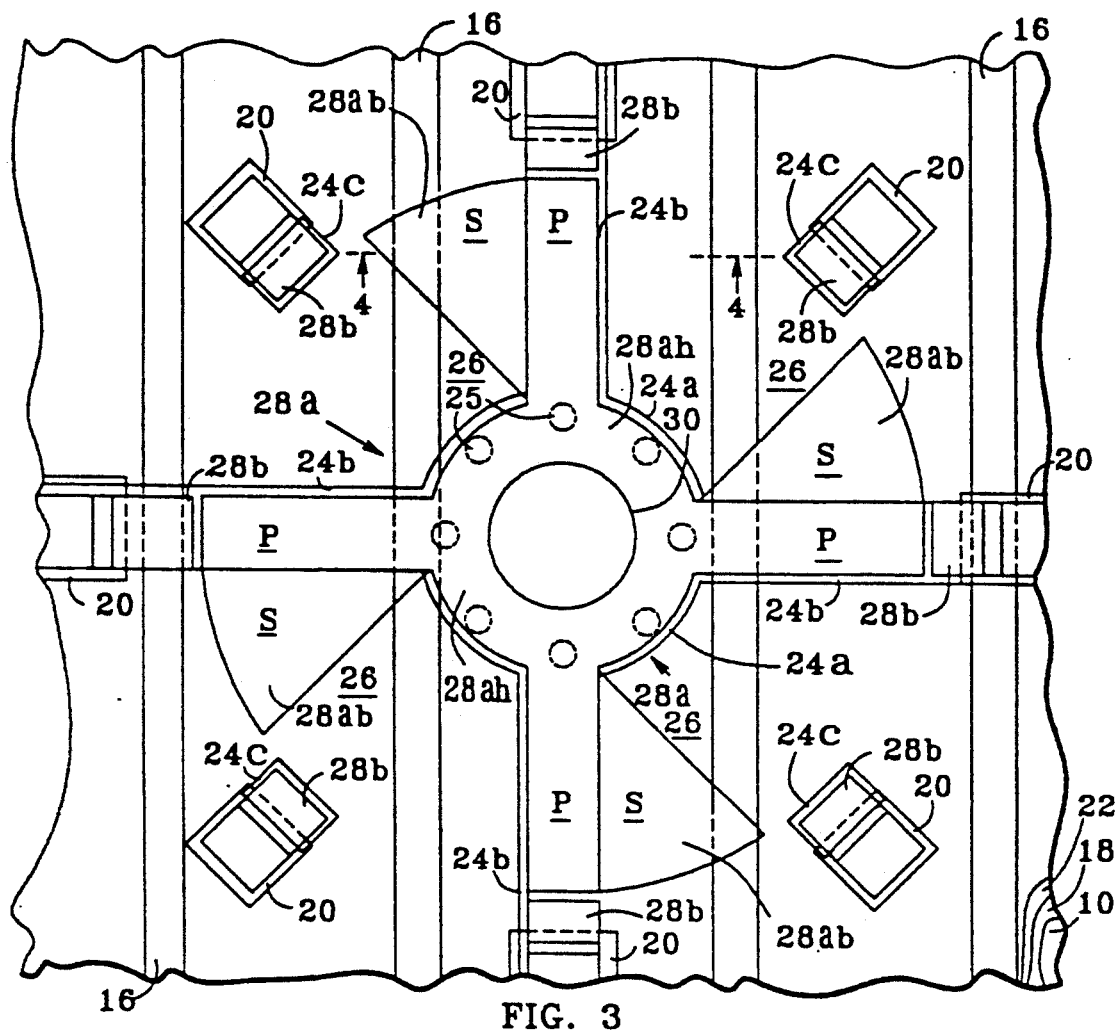
FIG. 3 is a plan view of the fan arrangement taken during one of the steps of the manufacturing process of the present invention.

A fourth mask is used to remove all of the second sacrificial layer 24 except for segments needed to form fan stators and fan blades, as shown in FIG. 2 and more clearly in plan view in FIG. 3, which include a circular segment 24a, elongated segments or strips 24b and substantially square segments 24c.

Figure 4:
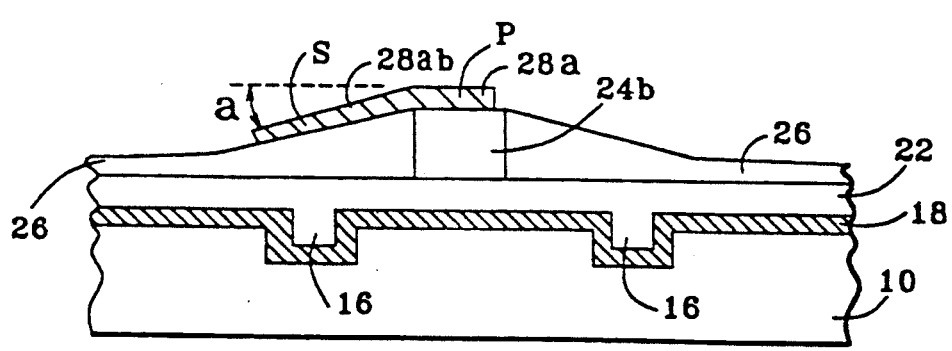
FIG. 4 is a sectional view taken through line 4—4 of FIG. 3 of the drawings.

After the second sacrificial layer segments 24a, 24b and 24c have been defined, a spin on insulating layer, such as spin on glass, accuglass 204 SOG, 26, shown in FIGS. 3 and 4, which is also sacrificial, is applied to the sacrificial planarizing layer 22 and the second sacrificial layer segments 24a, 24b and 24c, which, after appropriate spinning, as is known, takes a beveled or sloped form, as shown in the sectional view of FIG. 4 taken along line 4—4 of FIG. 3.

As taught by the art, spun applied layers are applied and cured on semiconductor surfaces. Materials such as SOG, which is silicon dioxide, and polyimide are used for insulating layers. These spun applied layers cover various topographical features on the semiconductor surface. The covering of the features requires changing thicknesses from the nominal thickness in a planar area to increased thicknesses in a topographical region. This change in thickness is smooth, with the slope being determined by spun apply tool parameters, initial spun applied layer thickness, spun applied material characteristics and the curing process. In this invention the parameters are designed for a required slope covering the sacrificial layers 24a, 24b and 24c. Materials such as polyimides and silicon dioxide, or SOG, are known to be made in thicknesses ranging from approximately 1 micrometer to more than 100 micrometers.

With the spun on insulator or glass 26 in place, a fifth mask is used to remove the spun on glass layer 26 from the surfaces of the silicon nitride layer segments 20, and, if desired, a reactive ion etching process may be used to remove any of the spun on glass layer 26 which may have been formed on the upper surfaces of the second sacrificial layer segments 24a, 24b and 24c.

A first layer of polysilicon 28 is then deposited over this structure and defined by a sixth mask to form a rotary element 28a having fan blades 28ab and fan hub 2Bah with an aperture 30 formed therein and a plurality of starors 28b, as shown in FIGS. 1, 2, 3 and 4 of the drawings. It should be noted, particularly from FIG. 4, that the fan blade 28ab has been provided with a necessary twist or bend so as to be able to move warm air from the surface of the semiconductor substrate or chip 10 during rotation by being formed at least in part on the slope of the spun on glass layer 26. As is known, the greater the twist in the fan blade 28ab, the more air the fan can move from the surface of the heated semiconductor substrate or chip 10, i.e., the movement of air increases as the angle a increases, as indicated in FIG. 4 of the drawings. Thus, the fan blade 28ab has portion S lying on the slope of the spun on glass layer 26 that is at an angle or twisted or bent with respect to a portion P of the fan blade 28ab located on the upper surface of the second sacrificial segment 24b, which is arranged in a plane parallel to the surface 14 of the semiconductor substrate 10, as indicated in FIGS. 1, 2, 3 and 4 of the drawings. The slope of the spun on glass layer 26 can be readily controlled over a relatively wide range of angles to provide the optimum slope for any given microfan.

A second layer of polysilicon forms an axle 32 as shown in FIG. 2 of the drawings. The axle 32 is formed by first etching sacrificial layers 22 and 24 through the aperture 30 of the hub 2Bah of the rotary element 28a to the surface of the thermally conductive layer 20 to provide an opening 34, by any known means, and then applying a conformal fourth sacrificial layer 36 over the entire structure including the sidewalls and bottom of the opening 34. A seventh mask and dry etching techniques are employed to remove the fourth sacrificial layer 36 from the bottom of the opening 34 so as to expose the thermally conductive layer 18. The second layer of polysilicon is then deposited over the fourth sacrificial layer 36 including the portion on the sidewalls of the opening 34 and in contact with the thermally conductive layer 20 at the bottom of the opening 34. The second layer of polysilicon is then masked, with an eighth mask, and etched to provide the axle 32 having a cylindrical portion C spaced from the aperture 30 in the hub 28ah of the rotary element 28a by the fourth sacrificial layer 36, a bottom portion B preferably in electrical contact with the semiconductor substrate or chip 10 through the thermally conductive layer 18 and a flange portion. F which prevents the rotary fan element 28a from sliding off the cylindrical portion C of the axle 32 after all the sacrificial layers are removed from the structure, as indicated in FIGS. 1 and 2 of the drawings. If desired, the axle 32 may be insulated from the thermally conductive layer 18 and a positive voltage, e.g., +5 volts, may be applied to the axle 32 to provide an electrostatic repelling force between the axle 32 and the rotary element 28a to eliminate or at least reduce friction between the axle 32 and the rotary element 28a during rotation of the rotary element 28a about the axle 32.

Also, if desired, a cover 38 may be placed over the structure to provide protection for the microfan by depositing a fifth sacrificial layer 40 over the fourth sacrificial layer 36 and the axle 32, followed by the deposition of the cover material, preferably a plastic, over the fifth sacrificial layer 40 and forming an opening 42 in the plastic material over the microfan. Optionally, a screen may be provided in the opening 42 to protect the microfan. Finally the structure is wet etched to remove the first, second, third, fourth and fifth sacrificial layers 22, 24, 24', 36 and 40, respectively, and the spun on insulation layer 26.

It can be seen that after all sacrificial material has been removed, the rotary element 28a is free to rotate about the axle 32, the stators 28b are electrically insulated from the semiconductor chip 10 and the thermally conductive layer 18, and the axle 32 is fixed to the thermally conductive layer 18 and electrically connected to the semiconductor chip 10 through the thermally conductive layer 18.

The microfan operates as an electrostatic fan on the same principle as any ordinary electrostatic fan by applying appropriate voltages to the stators 28b which produce a charge on the rotor, in this instance on the outer edge of each of the fan blades 28ab, as a respective fan blade approaches a given charged stator. These electrostatic fans may be designed for single or multiple phase operation, as is known, and the operating voltage applied to the stators 28b depends on the size of the gap between the stators 28b and the outer edge of the fan blades 28ab, which voltage may be less than 5 volts. To effectively remove the warm air from the back surface of the semiconductor chip 10, the microfan as illustrated in the drawings, particularly in FIGS. 1 and 4, would be made to rotate in a counterclockwise direction.

As mentioned hereinabove, to reduce friction that may be encountered by the rotary element 28a during rotation, the microfan may be provided with the bushing or bearing 25 located under the hub 2Bah of the rotary element 28a, as shown in FIGS. 1 and 2. However, if desired the stators 28b may be designed to be located at a higher level with respect to the level of the fan blades 28ab to urge the fan blades 28ab to move somewhat in an upward direction, or both techniques may be employed together. Also, a constant positive charge may be provided below the rotary element 28a to repel the element 28a from the semiconductor substrate 10 as the rotary element 28a is being forced by compacted air toward the substrate 10 during rotation.

It should be understood that each of the sacrificial layers 22, 24, 24', 36 and 40 may be made of silicon dioxide or, if desired, spun on glass or spun on polyimide or paralyene. Also, it should be noted that the spun on insulation or glass layer 26 may be a spun on polyimide, as well as silicon dioxide. Furthermore, the first and second polysilicon layers 28 and 32, respectively, may be made of conductive metal, such as, tungsten or copper, if desired.

It should also be understood that the silicon dioxide may be selectively etched by using buffered hydrofluoric acid at room temperature, buffered 100:1. The polyimide may be etched by using a suitable wet etch, such as, an aqueous solution of 0.268 molar sodium silicate, if uncured, and an aqueous solution of 5% by weight of tetraalkyl ammonium hydroxide, if cured, or dry etched using plasma oxygen and paralyene dry etched with plasma oxygen and wet etched with oxygen at approximately 200° C. in the atmosphere.

Figure 5:
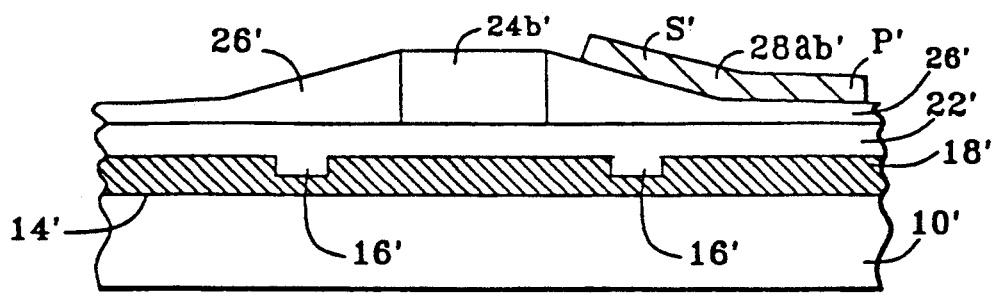
FIG. 5 is a sectional view somewhat similar to that of the sectional view of FIG. 4 but with the fan blade having a different shape, FIG. 6 indicates a plurality of fans of the present invention formed on a semiconductor substrate or chip which are controlled by power and control circuits disposed within the semiconductor substrate or chip, and FIG. 7 indicates a plurality of fans of the present invention formed on a semiconductor substrate or chip which are controlled by power and control circuits located off the semiconductor substrate or chip, with the operation of the power and control circuits being in turn controlled by a heat sensor located on the semiconductor substrate or chip.

FIG. 5 is a sectional view of another embodiment the microfan of the present invention taken through a fan blade 28ab' along a similar line to that taken in FIG. 4 of the drawings. It can be seen that fan blade 28ab' of FIG. 5 has a sloping or tilted portion S' which rises upwardly from its parallel portion P'. Thus, in this instance to move air effectively from the surface of a semiconductor substrate or chip 10' the fan blade 28ab' would be made to move from left to right, as viewed in FIG. 5. In this embodiment of the invention the semiconductor chip 10' has a blanket or smooth backside surface 14'. A thermally conductive layer 18' is blanket deposited on the smooth backside surface 14' and then grooves or channels 16' are formed at the upper surface of the thermally conductive layer 18' to aid in the removal of heat from the semiconductor chip 10'. The thermally conductive layer 18' may be made of, e.g., tungsten or copper. Planarizing sacrificial layer 22', a second sacrificial layer 24' and a spun on glass layer 26' are processed and used in much the same manner as discussed hereinabove in connection with the planarizing sacrificial layer 22, second sacrificial layer 24 and spun on insulating or glass layer 26 shown in FIGS. 1, 2, 3 and 4 of the drawings.

Figure 6:
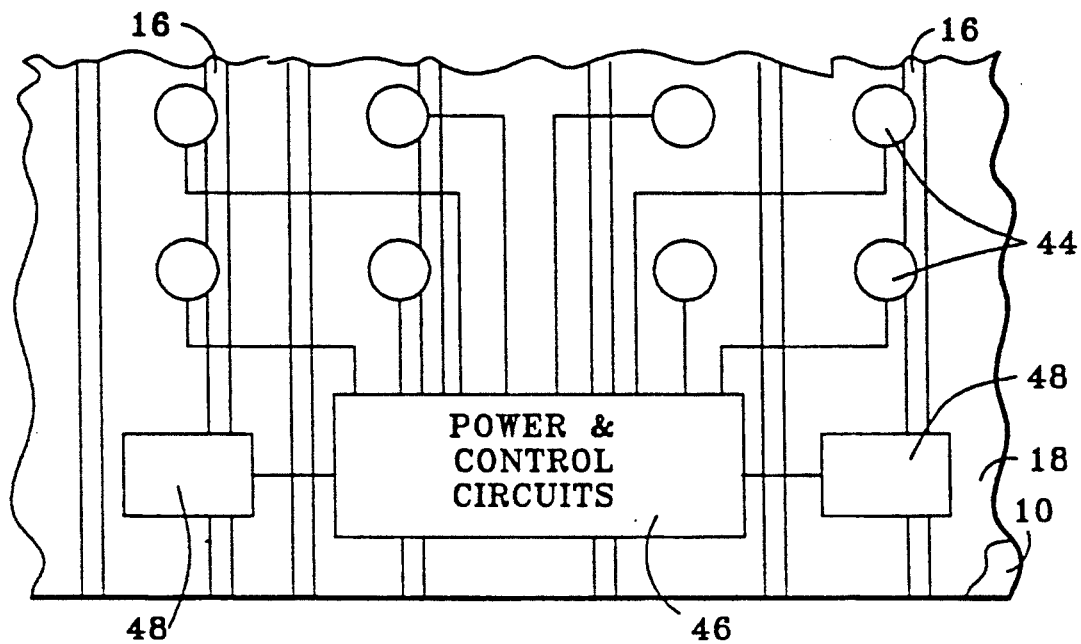

FIG. 6 indicates a plurality of microfans 44 formed on the back of an integrated circuit semiconductor substrate or chip 10 having grooves or channels 16 therein with a thermally conductive layer 18 applied thereto in much the same manner as discussed hereinabove in connection with the embodiment of the microfan illustrated in FIGS. 1, 2, 3 and 4 of the drawings. Each of these microfans is powered and controlled by power and control circuits 46 formed in the semiconductor chip 10. A voltage power source and control signals may be applied to the power and control circuits 46 through lands indicated at 48. Thus, each of the microfans 44 may have its speed controlled individually as necessary or desired. It should be understood that the wiring between the various electrical elements may represent more than one conductive line.

Figure 7:
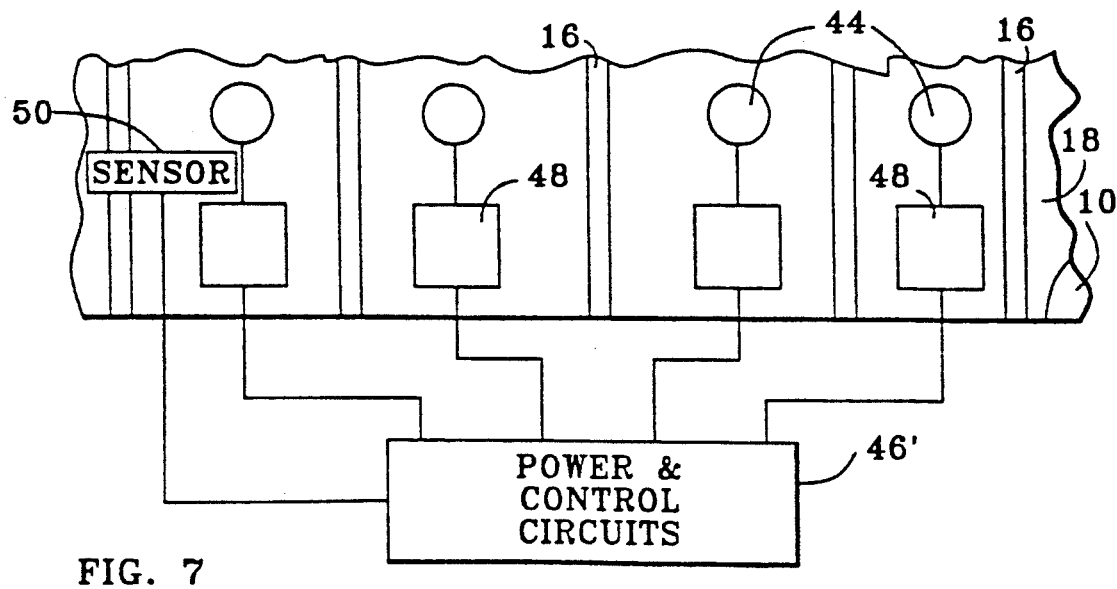

FIG. 7 indicates a plurality of microfans 44 similarly arranged to those shown in FIG. 6 of the drawings but with power and control circuits 46' being located off the semiconductor chip 10. The power and control circuits 46' are connected to the microfans through lands 48 located on the chip 10. The semiconductor substrate or chip 10 further includes a heat sensor 50 of any known type, such as, a semiconductor diode, which in turn controls the power and control circuits 46'

Although the microfan of the present invention has been described and illustrated as having four rotor blades and eight starors, it should be understood that the electrostatic microfan of the present invention may have any number of rotor blades and stators consistent with known electrostatic fan principles. Furthermore, the microfan of the present invention may be started, run and its direction determined consistent also with known electrostatic fan principles.

As is known, the volume of air moved by a fan is determined by the number of blades, fan circumference, fan and hub radius, fan tilt or twist, speed of the fan, etc. By applying typical dimensions to a six-bladed microfan having a diameter of 1 millimeter, a blade tilt of 0.1 millimeters and a speed of 2400 revolutions per minute, an analysis has shown that the microfan moves a volume of air of 1.5 cubic centimeters per second. For typical 40 watt packages for planned future high density logic chips, it is estimated that 1 cubic centimeter per second of warm air must be removed. Accordingly, it can be seen that the microfan of the present invention readily satisfies future integrated circuit semiconductor chip cooling requirements. An analysis made of the power consumed by the microfan itself when adequately cooling a chip shows that the microfan consumes approximately 0.018 watts at 5 volts and 3.6 milliamperes, whereas the chip cooling microfan operation cools many watts.

While the invention has been particularly shown and described with reference to preferred embodiments thereof, it will be understood by those skilled in the art that various changes in form and details may be made therein without departing from the spirit and scope of the invention.

We claim:

1. A process for making a microfan comprising
   forming a strip of sacrificial material on a planar surface of a heat source,
   applying a spin on sacrificial material over the heat source and the strip to produce a sloping surface extending from about the top of the strip toward the planar surface of the heat source,
   applying a layer of conductive material on the sloping surface and strip and
   defining from the layer of conductive material a rotary blade on the sloping surface of the spin on sacrificial material and a stator at one end of the blade.

2. A process for making a microfan as set forth in claim 1 wherein forming the strip of sacrificial material includes forming a strip of insulating material.

3. A process for making a microfan as set forth in claim 1 wherein forming the strip of sacrificial material includes forming a strip of silicon dioxide and wherein applying the layer of conductive material includes applying a layer of polysilicon.

4. A process for making a microfan as set forth in claim 1 wherein applying the layer of conductive material includes applying a layer of metal.

5. A process for making a microfan comprising
   forming a segment of a given insulating material on a planar surface of a semiconductor substrate having a source of heat therein,
   forming a strip of insulating material on the planar surface of said semiconductor substrate,
   forming a layer of insulating material over said semiconductor substrate and said strip of insulating material by using spin on techniques to provide a sloping surface on the layer of insulating material from the top of said strip toward the planar surface of said semiconductor substrate,
   applying a layer of electrically conductive material on said layer of insulating material,
   defining in said layer of electrically conductive material a rotary element including a fan blade on the sloping surface of said layer of insulating material and a hub having an aperture therein and a stator on said segment of the given insulating material,
   forming an axle within the aperture of said hub, and
   etching away said strip of insulating material and said layer of insulating material.

6. A process for making a microfan as set forth in claim 5 further including forming a bushing under the hub of said rotary element made of said given insulating material.

7. A process for making a fan arrangement on a semiconductor chip having a heating source therein comprising
   forming a plurality of channels at a planar surface in said chip,
   applying a thermally conductive layer on the planar surface of said chip and into said plurality of channels,
   forming a plurality of insulating segments on said thermally conductive layer,
   applying a planarizing sacrificial layer over said thermally conductive layer,
   forming a plurality of sacrificial strips on said planarizing layer extending outwardly from a given point,
   forming a plurality of bushings in a circular arrangement,
   applying a spin on sacrificial layer on said planarizing layer and on said strips to provide sloping surfaces extending from about the top of each of said plurality of sacrificial strips toward the planar surface of said chip,
   applying a first electrically conductive layer on said spin on sacrificial layer and on said plurality of insulating segments,
   defining in said electrically conductive layer a rotary element including fan blades on the sloping surfaces of said spin on sacrificial layer and a hub having an aperture therein and a plurality of stators each disposed on a respective one of said plurality of insulating segments, said hub being disposed above but spaced from said plurality of bushings,
   forming an opening defined by the aperture in said hub to said thermally conductive layer through the sacrificial material, applying a conformal sacrificial layer over said electrically conductive layer and on the sidewalls of said opening, applying a second electrically conductive layer over said conformal sacrificial layer and over said thermally conductive layer, defining in said second electrically conductive layer an axle within the aperture in said hub, and etching away said planarizing sacrificial layer, said plurality of sacrificial strips, said spun on sacrificial layer and said conformal sacrificial layer to free said rotating element from said axle.

* * * * *